(12) United States Patent
Inami et al.

(10) Patent No.: US 8,970,697 B2
(45) Date of Patent: Mar. 3, 2015

(54) IMAGE DISTRIBUTION APPARATUS

(75) Inventors: Satoshi Inami, Osaka (JP); Akihiro Miyazaki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 459 days.

(21) Appl. No.: 13/377,716

(22) PCT Filed: Jan. 24, 2011

(86) PCT No.: PCT/JP2011/000343
§ 371 (c)(1),
(2), (4) Date: Dec. 12, 2011

(87) PCT Pub. No.: WO2012/004907
PCT Pub. Date: Jan. 12, 2012

(65) Prior Publication Data
US 2012/0151601 A1 Jun. 14, 2012

(30) Foreign Application Priority Data
Jul. 6, 2010 (JP) .................................. 2010-154240

(51) Int. Cl.
*H04N 7/18* (2006.01)
*G06T 1/00* (2006.01)
*G08B 13/196* (2006.01)
(52) U.S. Cl.
CPC ............. *G06T 1/00* (2013.01); *G08B 13/19686* (2013.01)
USPC .......................................... 348/143; 348/161
(58) Field of Classification Search
CPC ................. H04N 7/183; G08B 13/196; G06T 2207/30232
USPC .................................................. 348/143, 161
See application file for complete search history.

(56) References Cited

U.S. PATENT DOCUMENTS

2008/0055422 A1* 3/2008 Takayama ................... 348/211.8
2009/0128632 A1 5/2009 Goto et al.

FOREIGN PATENT DOCUMENTS

JP 2002027425 A * 1/2002 ............. H04N 7/173
JP 2003-46745 2/2003

(Continued)

OTHER PUBLICATIONS

International Search Report issued Feb. 15, 2011 in corresponding International Application No. PCT/JP2011/000343.

(Continued)

*Primary Examiner* — Thai Tran
*Assistant Examiner* — Girumsew Wendmagegn
(74) *Attorney, Agent, or Firm* — Wenderoth, Lind & Ponack, L.L.P.

(57) ABSTRACT

An image distribution apparatus that ensures both privacy protection and security is provided. A private area storage section stores private areas relating to the privacy of users. A cutout area storage section stores, as a cutout area, an area requested by an identified user to be distributed. An image processing level storage section stores an image processing rule that defines an image processing level for each of areas having different levels of privacy. An image processing area generation section acquires the cutout area of the identified user from the cutout area storage section, acquires, from the private area storage section, a private area of the identified user and a private area of a person other than the identified user, which private areas are contained in an image of the acquired cutout area, acquires the image processing rule from the image processing level storage section, and then determines an image processing method for each area in the cutout area in accordance with the acquired image processing rule.

19 Claims, 16 Drawing Sheets

(56) References Cited

FOREIGN PATENT DOCUMENTS

| | | |
|---|---|---|
| JP | 2003-61076 | 2/2003 |
| JP | 2005-252849 | 9/2005 |
| JP | 2007-213181 | 8/2007 |
| JP | 2008-66893 | 3/2008 |
| JP | 2008-97379 | 4/2008 |
| JP | 2009-124618 | 6/2009 |
| JP | 2009124618 A * | 6/2009 |

OTHER PUBLICATIONS

Machine translation of Japanese Patent Application Publication No. 2003-061076, published Feb. 28, 2003.

* cited by examiner

| CUTOUT AREA | | | | | |
|---|---|---|---|---|---|
| REQUEST ID | USER ID | x | y | w | h |
| 123 | 568 | 360 | 430 | 210 | 350 |
| 124 | 3 | 490 | 308 | 690 | 358 |
| ... | | ... | ... | ... | ... |

| PRIVATE AREA | | | | | |
|---|---|---|---|---|---|
| USER ID | AREA ID | x1 | x2 | x3 | X4 |
| 568 | 1 | (360,360) | (430,569) | (210,230) | ... |
| 569 | 2 | (100,100) | (150,100) | (150,200) | ... |
| 569 | 3 | ... | ... | ... | ... |
| ... | | ... | ... | ... | ... |

| PRIVATE AREA | | |
|---|---|---|
| USER ID | AREA ID | DATA ADDRESS |
| 568 | 1 | 1500 |
| 569 | 2 | 1490 |
| 569 | 3 | ... |
| ... | | ... |

FIG. 5A

| IMAGE PROCESSING RULE | |
|---|---|
| AREA TYPE | LEVEL |
| PRIVATE AREA | HIGH RESOLUTION |
| PUBLIC AREA | MODERATE RESOLUTION |
| ANOTHER PERSON'S PRIVATE AREA | BLURRING PROCESSING |
| BOUNDARY AREA | MODERATE RESOLUTION |
| ... | ... |

FIG. 5B

| IMAGE PROCESSING RULE | | |
|---|---|---|
| AREA ID | ADDITIONALLY-PERMITTED USER ID | RESOLUTION THRESHOLD (pixel) |
| 1 | 350 | 5 |
| 2 | NON | 10 |
| ... | ... | ... |

F I G. 7A

| PRIVATE AREA ||||||
|---|---|---|---|---|---|
| USER ID | AREA ID | x1 | x2 | x3 | X4 |
| 568 | 1 | (360,360) | (430,569) | (210,230) | ... |
| 569 | 2 | (360,360) | (430,569) | (210,230) | ... |
| 569 | 3 | ... | ... | ... | ... |
| ... | | ... | ... | ... | ... |

F I G. 7B

| IMAGE PROCESSING RULE |||
|---|---|---|
| AREA ID | ADDITIONALLY-PERMITTED USER ID | RESOLUTION THRESHOLD (pixel) |
| 1 | 570 | - |
| 1 | 571 | - |
| ... | ... | ... |

F I G. 7C

| IMAGE PROCESSING RULE ||
|---|---|
| AREA TYPE | LEVEL |
| PRIVATE AREA | HIGH RESOLUTION |
| PUBLIC AREA | MODERATE RESOLUTION |
| ANOTHER PERSON'S PRIVATE AREA | BLURRING PROCESSING |
| BOUNDARY AREA | MODERATE RESOLUTION |
| GROUP AREA | MODERATE RESOLUTION |
| ... | ... |

F I G. 7 D

| IMAGE PROCESSING RULE | | |
|---|---|---|
| AREA ID | ADDITIONALLY-PERMITTED USER ID | AREA TYPE |
| 1 | 350 | PRIVATE AREA |
| 2 | NON | GROUP AREA |
| ... | ... | ... |

F I G. 7 E

| PRIVATE AREA | | | | | |
|---|---|---|---|---|---|
| USER ID | AREA ID | x1 | x2 | x3 | X4 |
| 568 | 1 | (360,360) | (430,569) | (210,230) | ... |
| 568 | 2 | (100,100) | (150,100) | (150,200) | ... |
| ... | | ... | ... | ... | ... |

FIG. 8
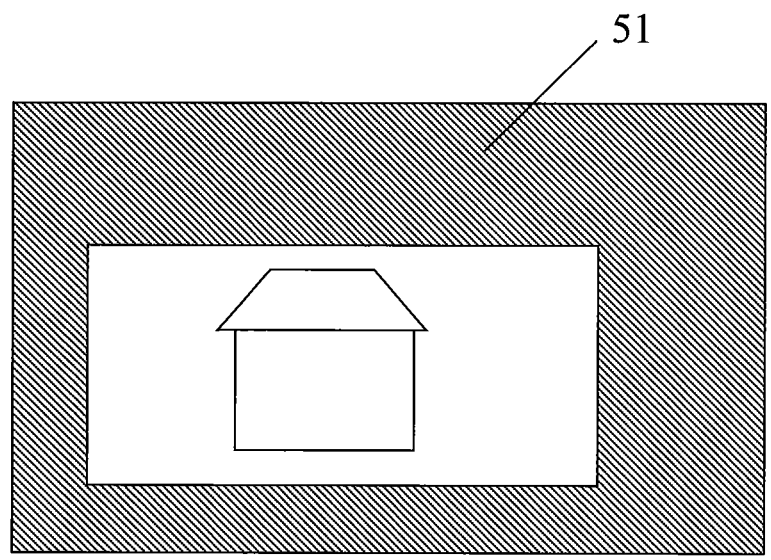
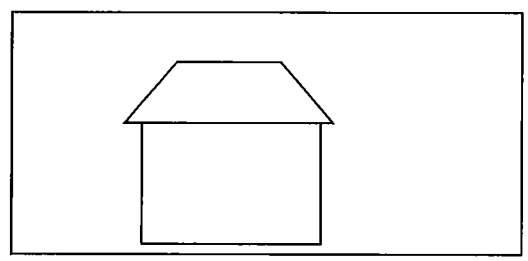

FIG. 9A

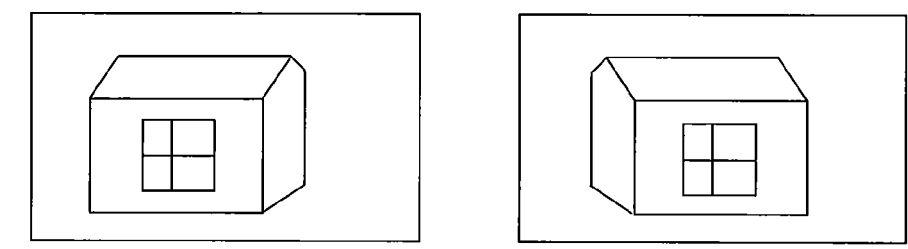

① GENERATE THREE-DIMENSIONAL MODEL FROM STEREO IMAGE

③ DETERMINE CORRESPONDING PRIVATE AREAS BY RETURNING THREE-DIMENSIONAL MODEL TO TWO-DIMENSIONAL IMAGE

 

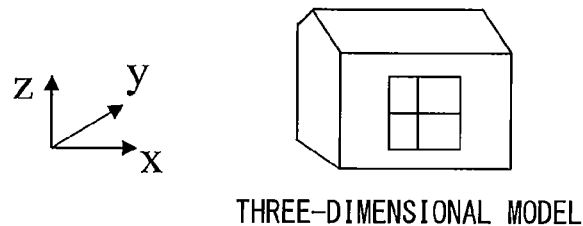

THREE-DIMENSIONAL MODEL

② COMPARE THREE-DIMENSIONAL MODEL WITH PRIVATE AREAS WHICH ARE HELD IN ADVANCE IN TERMS OF X, Y COORDINATES

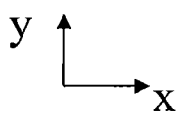

| PERSON D | PERSON E | PERSON F |
|---|---|---|
| PERSON A | PERSON B | PERSON C |

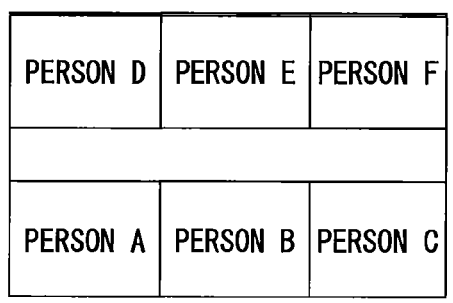

RESPECTIVE PRIVATE AREAS

F I G. 1 0
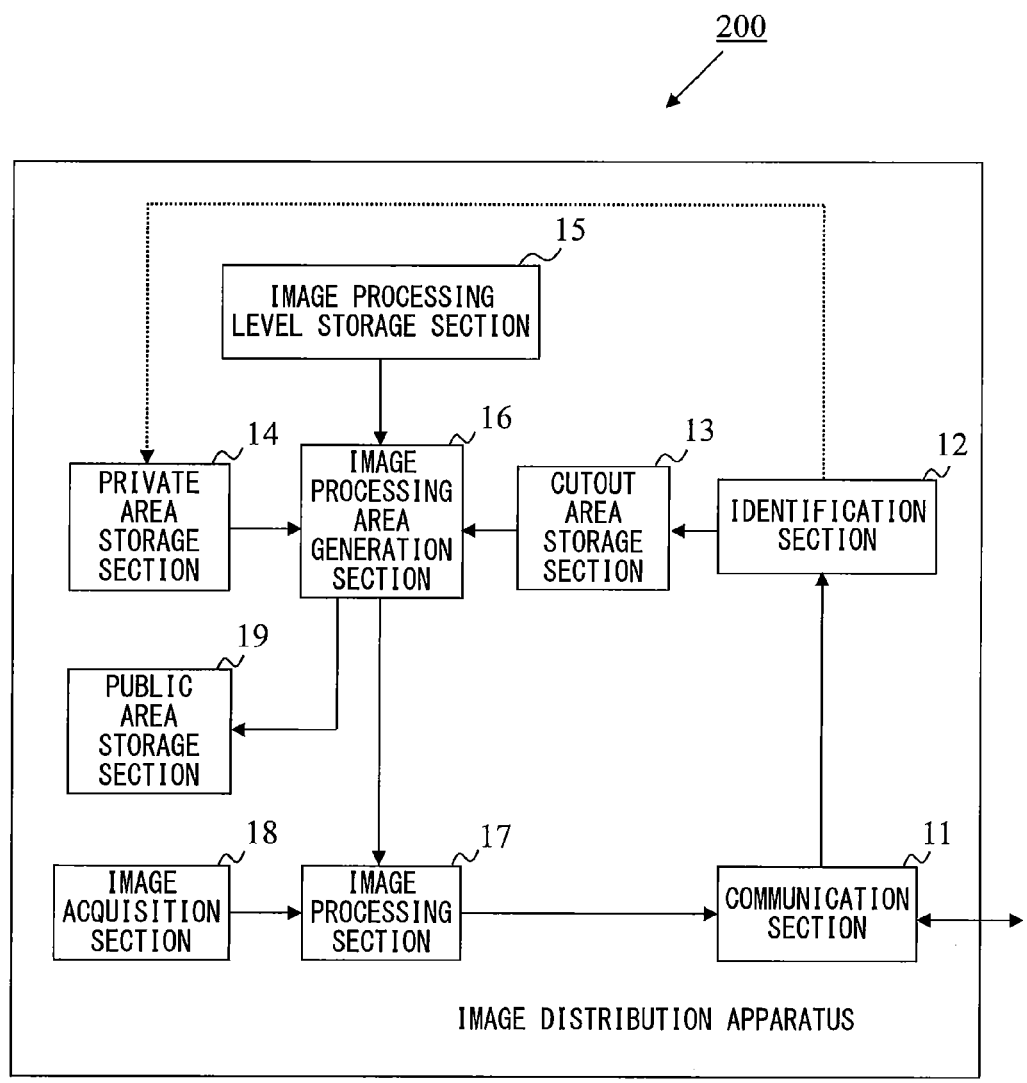

F I G. 1 1
| PUBLIC AREA | | |
|---|---|---|
| USER ID | DISTRIBUTION-<br>REQUESTED AREA<br>(x,y,w,h) | PUBLIC AREA ID |
| 568 | (10,10,30,50) | 500 |
| 569 | (200,200,30,50) | 490 |
| 569 | (150,100,40,30) | ... |
| ... | ... | ... |
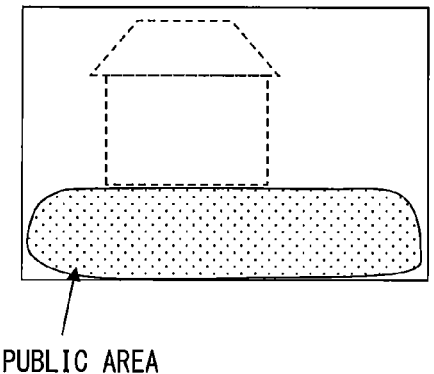
PUBLIC AREA FIG. 13B
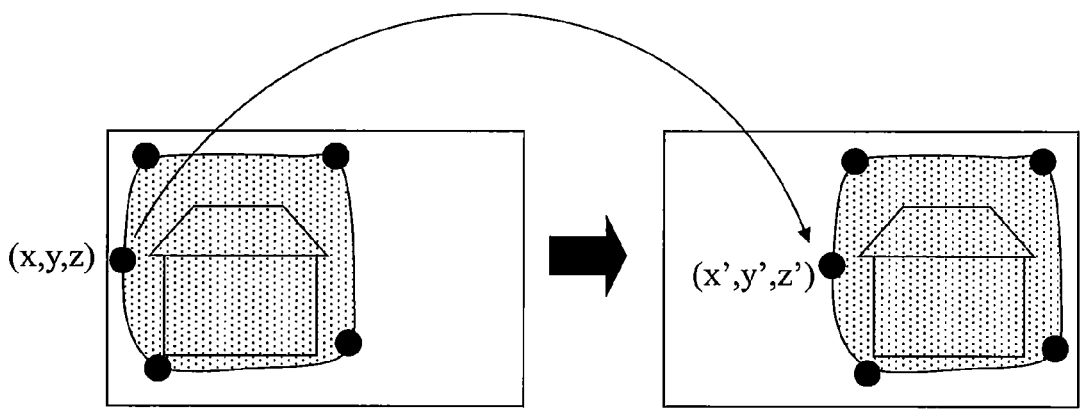
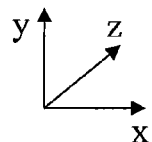
FIG. 14
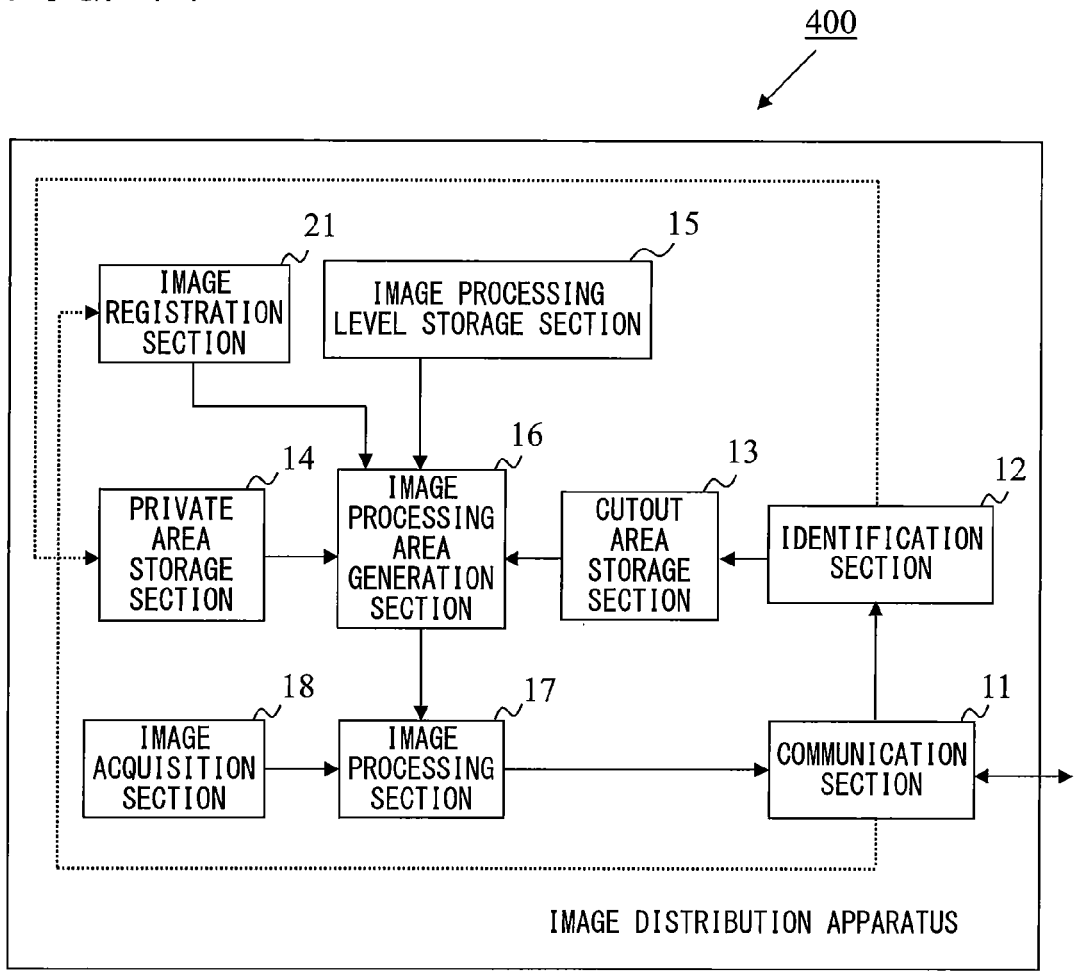

| IMAGE PROCESSING RULE | |
|---|---|
| AREA TYPE | LEVEL |
| PRIVATE AREA | HIGH RESOLUTION |
| PUBLIC AREA | MODERATE RESOLUTION |
| ANOTHER PERSON'S PRIVATE AREA | BLURRING PROCESSING |
| BOUNDARY AREA | MODERATE RESOLUTION |
| SUSPICIOUS PERSON AREA | HIGH RESOLUTION |
| ... | ... |

IMAGE DISTRIBUTION APPARATUS

TECHNICAL FIELD

The present invention relates to apparatuses for distributing images captured by cameras and the like, and particularly relates to an image distribution apparatus that realizes privacy-conscious security.

BACKGROUND ART

In recent years, security cameras have been developed that are connectable to networks, have high resolutions, and can improve efficiency by performing image recognition processing. Such a security camera is capable of capturing images of unprecedentedly and incomparably high resolutions, and allows for the construction of a security system that covers a wide range of areas. In addition, it is possible to extract suspicious persons by means of a security camera performing image recognition. If a specific person, such as a child, who particularly needs to be watched over is registered, it is also possible to provide a security service on the way to and from school. However, when capturing images of public places, houses, and the like, it is required to capture the images with attention to the privacy of others.

There are conventional security camera systems and monitoring systems that do not distribute unprocessed images captured by security cameras, but perform masking processing on the images and distribute the resultant images to users in order to protect privacy or personal information (see Patent Literature 1, for example). According to the conventional technique described in Patent Literature 1, masking processing is performed on a captured image in such a manner as to change areas to be masked depending on users, instead of simply maintaining a single masked area, whereby privacy is appropriately protected. For example, Patent Literature 1 discloses that when a user monitors a parking lot, the privacy of others is taken care of by performing masking processing for other spaces than the user's contracted space and thus allowing the user to monitor only the contracted space. Also, there is an example in which the range of image allowed to be seen can be changed depending on the types of users, such as general users, security guards, and police officers. For example, police officers who have need to obtain sufficient information to solve cases may be allowed to see the entire range of image while limiting the range of image that is allowed to be seen by general users who have no such need. In addition, in the case where the image capturing range changes due to the movement or zooming of the camera, the range of area to be masked can be changed. Therefore, it is possible to perform image capturing with attention to privacy while performing monitoring for the purpose of ensuring security.

Further, there is another example in which settings for privacy protection, which are made by a person who performs image capturing, can be checked from the outside and changed (see Patent Literature 2, for example). According to the conventional technique described in Patent Literature 2, settings for privacy protection on a camera located at a house A can be checked by a person living in a house B. Specifically, if the person living in the house B checks how an image of his or her own house is captured and has an objection to the settings for privacy protection, the person can request that areas to be masked should be changed. After receiving the request, a person living in the house A can determine whether or not to change the settings. Providing such a function enables a subject of image capturing to check settings for privacy protection, and therefore makes it possible to offer a more reliable privacy protection function.

CITATION LIST

Patent Literature

[PTL 1] Japanese Laid-Open Patent Publication No. 2003-46745

[PTL 2] Japanese Laid-Open Patent Publication No. 2005-252849

SUMMARY OF THE INVENTION

Problems to be Solved by the Invention

According to the configuration of Patent Literature 1, registration can be made such that the size of masked area is appropriately set depending on users. However, the processing load on the system is increased since an image of each part of a given area, of which a camera image may be requested to be viewed by users, is captured and processed with a resolution appropriate for each user. For example, it is necessary to send a high-resolution image of an area containing a user's house and the like, of which detailed image data is most required by the user. In addition, in the case where a person is determined to be a suspicious person for the area containing the user's house, even if private areas of others are in the background, it is necessary to send a highest-resolution image of the suspicious person while blurring the background. Accordingly, the configuration of Patent Literature 1 has a problem in that necessary and sufficient privacy protection and security cannot be ensured at the same time with reduced processing load on the system.

Further, demands for privacy vary from person to person. For example, some people feel no concern as long as the resolution is not very high, some people allow only their relatives to see images if the resolution is low, and some people never want to let anyone see images. If, nonetheless, masking processing is performed uniformly for private areas of all subjects of image capturing in order to save the trouble of checking the demand of each subject, the number of areas to be masked is unnecessarily increased. This results in reduction in the range of image that can be seen, and increase in the load applied on the system. Especially when images of areas in which there are a large number of people are captured at the same time by a high-resolution camera, the required cost is increased. However, checking the demands of all subjects of image capturing also requires a considerable cost.

According to the configuration of Patent Literature 2, a subject of image capturing can register his or her own private area. However, when the registered private area is close to or overlaps a private area of another person, the subject and the other person need to check the image-captured area by means of a captured image and make an adjustment, which requires time and effort. Especially when images of private areas of many people are captured at the same time by a high-resolution camera, the required effort is increased. In addition, when changes occur in the private areas in association with change in the shape of buildings or growth of plants, an adjustment needs to be made again.

Therefore, the present invention has been made to solve the conventional problems, and its object is to easily provide a security camera that processes a captured image of a given area in a manner appropriate for each user, and thereby ensures both necessary and sufficient privacy protection and security with reduced processing load.

Solution To The Problems

In order to achieve the above object, an image distribution apparatus of the present invention includes: a communication section for communicating with a client device; an image acquisition section for acquiring an image; a private area storage section for storing private areas relating to the privacy of users; an identification section for identifying a user based on information contained in an image distribution request received from the client device via the communication section; a cutout area storage section for storing, as a cutout area, an area requested by the identified user to be distributed; an image processing level storage section for storing an image processing rule that defines an image processing level for each of areas having different levels of privacy; an image processing area generation section for acquiring the cutout area of the identified user from the cutout area storage section, acquiring, from the private area storage section, a private area of the identified user and a private area of a person other than the identified user, which private areas are contained in an image of the acquired cutout area, acquiring the image processing rule from the image processing level storage section, and determining an image processing method for each area in the cutout area in accordance with the acquired image processing rule; and an image processing section for processing the image acquired by the image acquisition section in accordance with the image processing method determined by the image processing area generation section.

The image processing level storage section stores an image processing rule that defines an image processing level for the private area of the identified user and an image processing level for the private area of the person other than the identified user. The image processing level for the private area of the other person is for generating a less clear image than an image of the private area of the identified user for the purpose of privacy protection.

The image processing level storage section stores an image processing rule that defines an image processing level for a boundary area between private areas, and notifies the image processing area generation section of the image processing level for the boundary area as an image processing level for an area and its vicinity, where the private area of the identified user and the private area of the other person are close to each other. The image processing level for the boundary area is for generating a less clear image than the image of the private area of the identified user for the purpose of privacy protection.

The image processing level storage section stores an image processing rule that defines an image processing level for a boundary area between private areas, and notifies the image processing area generation section of the image processing level for the boundary area as an image processing level for an area and its vicinity, where the private area of the identified user and the private area of the other person overlap each other. The image processing level for the boundary area is for generating a less clear image than the image of the private area of the identified user for the purpose of privacy protection.

The image processing level storage section stores an image processing rule that defines an image processing level for a public area including all areas other than private areas. The image processing level for the public area is for generating a less clear image than the image of the private area of the identified user for the purpose of privacy protection.

The image processing area generation section determines to perform image processing with a high resolution for the private area of the identified user, and perform image processing with a low resolution for the private area of the other person, in accordance with the image processing rule acquired from the image processing level storage section.

The image processing area generation section determines to perform image processing with a high resolution for the private area of the identified user, and perform image processing with a low resolution for the boundary area, in accordance with the image processing rule acquired from the image processing level storage section.

The image processing area generation section calculates, within the cutout area of the identified user, the public area including all areas other than private areas, and determines to perform image processing with a high resolution for the private area of the identified user, and perform image processing with a low resolution for the public area, in accordance with the image processing rule acquired from the image processing level storage section.

The image distribution apparatus further includes an image registration section in which a face image of a related person is registered.

When a captured face image of a person overlapping the private area of the other person does not match the face image of the related person which is registered in the image registration section, the image processing area generation section determines the person whose image is captured to be a suspicious person, and determines to perform image processing with a high resolution for the suspicious person.

The image processing level storage section further stores an image processing rule that defines an image processing level for the suspicious person. The image processing area generation section determines an image processing method for the suspicious person in accordance with the image processing level for the suspicious person.

The image distribution apparatus further includes a public area storage section for storing the public area corresponding to an ID of the identified user and the area requested by the identified user to be distributed. When the same user requests the same area to be distributed, the image processing area generation section reads out, from the public area storage section, the public area corresponding to the ID of the identified user and the area requested by the identified user to be distributed, and determines to perform image processing for the read public area The image processing level storage section stores a resolution threshold corresponding to the private area of the other person. When the size of the private area of the other person is smaller than the resolution threshold, the image processing area generation section determines not to perform image processing with a low resolution for the private area of the other person for the purpose of privacy protection.

The image processing level storage section stores an additionally-permitted user ID corresponding to the private area of the other person. When a user ID of the user targeted for image distribution is identical to the additionally-permitted user ID, the image processing area generation section determines not to perform image processing with a low resolution for the private area of the other person.

The cutout area storage section sequentially receives different areas requested by the identified user to be distributed, and changes the cutout area in accordance with the received area.

The image acquisition section acquires a stereo image. The image distribution apparatus further includes a private area registration section for generating a three-dimensional model from the stereo image acquired by the image acquisition section, performing matching between the three-dimensional model and map data in which two-dimensional private areas are written to determine whether each area of the stereo image is a private area of a user, and registering the private area thus determined in the private area storage section.

When detecting that the periphery of image data to be distributed to a user has been subjected to image processing for the purpose of privacy protection, the image processing section removes the periphery, and notifies the communication section of the resultant image data.

Advantageous Effects of the Invention

According to the image distribution apparatus of the present invention, when a security system is realized by means of a high-resolution camera which is shared among a number of users, each user can check, with a high resolution, an image of the user's private area such as his or her house that the user preferentially wants to monitor. In addition, the user can check, with a low resolution, an image of a public area such as a public road, where there are passersby and it is necessary to confirm only the safety of a child while protecting the privacy of others. Further, when an image of a private area of each user is distributed to another person, the image can be subjected to blurring processing. Moreover, it is also possible to check an image of a boundary area between private areas with a resolution that is set with attention to the privacy of others. Therefore, it is possible to efficiently control the image resolution and the like depending on the types of areas, whereby both privacy protection and security can easily be ensured.

BRIEF DESCRIPTION OF THE DRAWINGS

FIG. 5A is a diagram showing an example of an image processing rule (area-type-dependent privacy level management table) held in an image processing level storage section 15 according to the first embodiment of the present invention.

FIG. 5B is a diagram showing an example of an image processing rule (area attribute information management table) held in the image processing level storage section 15 according to the first embodiment of the present invention.

FIG. 7A is a diagram showing an example of data of private areas held in the private area storage section 14 according to the first embodiment of the present invention.

FIG. 7B is a diagram showing an example of an image processing rule (area attribute information management table) held in the image processing level storage section 15 according to the first embodiment of the present invention.

FIG. 7C is a diagram showing an example of an image processing rule (area-type-dependent privacy level management table) held in the image processing level storage section 15 according to the first embodiment of the present invention.

FIG. 7D is a diagram showing an example of an image processing rule (area attribute information management table) held in the image processing level storage section 15 according to the first embodiment of the present invention.

FIG. 7E is a diagram showing an example of data of private areas held in the private area storage section 14 according to the first embodiment of the present invention.

FIG. 8 is a diagram showing an example of the case where an area of an image to be distributed is removed in the first embodiment of the present invention.

FIG. 9A is a diagram showing an example of the case where private areas are determined by means of a 3D image and a 2D image in the first embodiment of the present invention.

FIG. 10 is a block diagram showing an example of the configuration of an image distribution apparatus 200 according to a second embodiment of the present invention.

FIG. 11 is a diagram showing an example of data indicating public areas stored in a public area storage section 19 according to the second embodiment of the present invention.

FIG. 13B is a diagram illustrating a second method for detecting the image capturing position of the camera.

FIG. 14 is a block diagram showing an example of the configuration of an image distribution apparatus 400 according to a fourth embodiment of the present invention.

DESCRIPTION OF EMBODIMENTS (First Embodiment)

Figure 1:
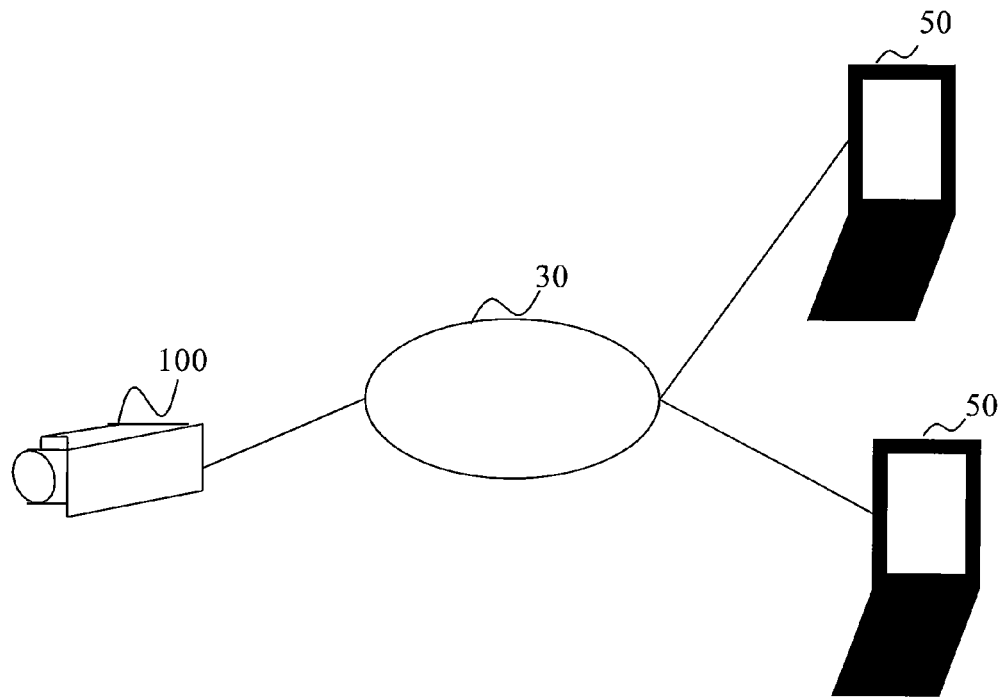
FIG. 1 is a block diagram showing an example of the configuration of a security system according to a first embodiment of the present invention.

FIG. 1 is a block diagram showing an example of the configuration of a security camera system according to a first embodiment of the present invention. In FIG. 1, an image distribution apparatus 100 includes, for example, a camera equipped with a lens. The image distribution apparatus 100 captures an image, processes the image, and distributes the processed image to a plurality of client devices 50 via a network 30. Each client device 50 reproduces the image sent from the image distribution apparatus 100.

Figure 2:
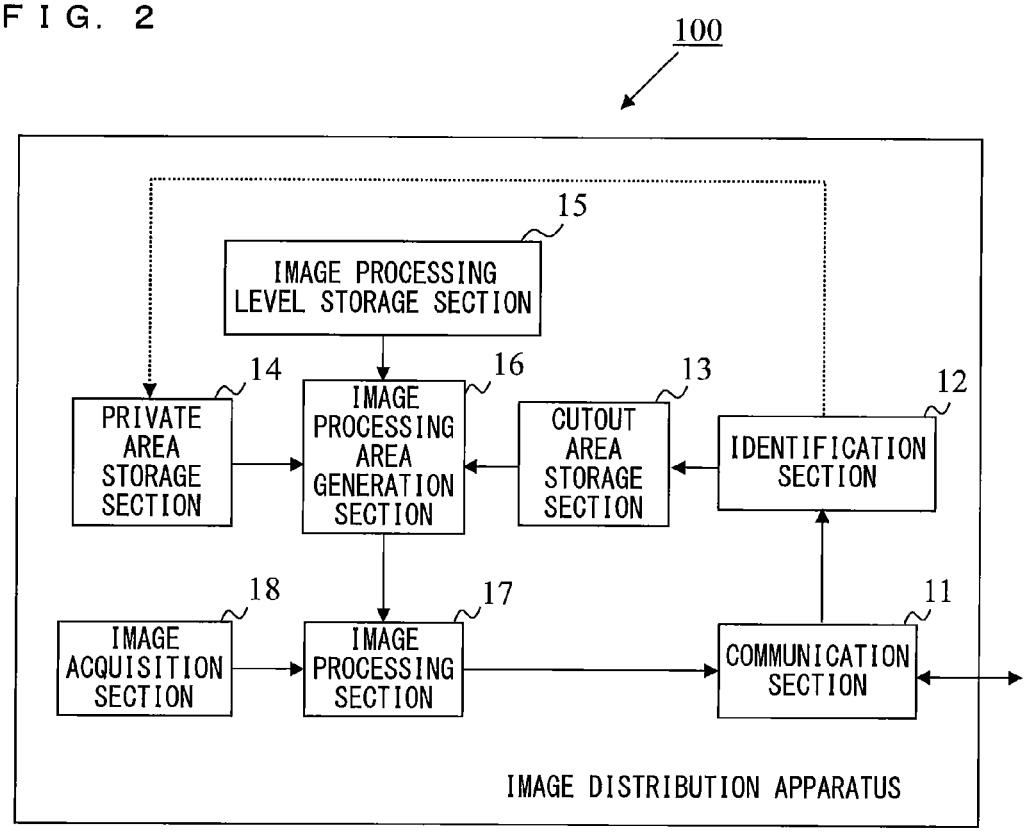
FIG. 2 is a block diagram showing an example of the configuration of an image distribution apparatus 100 according to the first embodiment of the present invention.

FIG. 2 is a block diagram showing an example of the configuration of the image distribution apparatus 100 according to the first embodiment of the present invention. In FIG. 2, the image distribution apparatus 100 includes a communication section 11, an identification section 12, a cutout area storage section 13, a private area storage section 14, an image processing level storage section 15, an image processing section 17, and an image acquisition section 18. The communication section 11 is connected to the network 30, and distributes an image to a client device 50. The communication section 11 may be connected to the network 30 via wired connection or via wireless connection by means of a wireless LAN, or the like. Upon receiving an image distribution request from a client device 50, the communication section 11 starts communication with the client device 50.

The identification section 12 receives user information from a client device 50 via the communication section 11, and identifies the user to whom an image is to be distributed. The identification may be performed by means of an ID and a password, or may be performed through biometric authentication using irises, fingerprints, veins, or the like.

The cutout area storage section 13 stores a cutout area of which an image is to be distributed to a user. A cutout area may be specified every time of use via the communication section 11 in response to an image distribution request from the user, or a cutout area specified at the first time of use may be stored for subsequent use and may be updated at an arbitrary timing. Alternatively, the cutout area storage section 13 may store, as a cutout area, a default image area corresponding to the user.

The private area storage section 14 stores private areas of users of the security camera system. The private areas indicate which portions of a screen correspond to areas relating to the privacy of the users. That is, image areas that each of the users does not want another person to see are stored in the private area storage section 14 as the private areas. The private areas of the users may be stored in advance in the private area storage section 14, or may be registered in the private area storage section 14 by the users at an arbitrary timing, for example, at the first time of use. In addition, the private areas may be registered in the private area storage section 14 only by the users who have been identified by the identification section 12.

The image processing level storage section 15 stores image processing rules that define, for each area having a different level of privacy, an image processing level indicating in what manner image processing is performed. The image processing rules are used for determining, for example, which private area is subjected to blurring processing. For example, the image processing rule includes a rule stipulating that when an image of a private area is distributed to a user who has registered the private area, a high-resolution image is distributed, and that when the image of the private area is distributed to another person, the image is distributed after being subjected to blurring processing.

In addition, the image processing rules may include a rule stipulating that because an area that is not registered as a private area is a public area, the image of the area is distributed with a low resolution. Further, the image processing rules may include a rule stipulating that blurring processing is not performed on an image having a low resolution. Still further, the image processing rules may include a rule stipulating that among private areas within a cutout area, a private area for which the resolution is lower than a predetermined resolution is not subjected to blurring processing. Still further, the image processing rules may include a rule stipulating that when one private area and another private area overlap or are close to each other, it is recognized that there is a boundary area between the private areas, and then the resolution of the image of the boundary area and its vicinity is reduced.

An image processing area generation section 16 determines the types of areas in an image to be distributed to a user, and determines an image processing method. First, based on user information identified by the identification section 12, the image processing area generation section 16 acquires, from the cutout area storage section 13, a cutout area that the user is requesting, and acquires, from the private area storage section 14, a private area registered by the user. Next, the image processing area generation section 16 determines, in the cutout area that the user is requesting, which part is the private area of the user who is requesting the image distribution, which part is a private area of a person other than the user, which part is a public area, and the like. In addition, the image processing area generation section 16 acquires an image processing rule from the image processing level storage section 15, and finally determines an image processing method. That is, the image processing area generation section 16 determines what levels of resolutions are applied to the images of the respective private areas and the public area, whether blurring processing needs to be performed, and the like.

The image processing section 17 performs image processing in accordance with an image processing method determined by the image processing area generation section 16, cuts out an image of an area that a user is requesting, and notifies the communication section 11 of the image data. The image acquisition section 18 is, for example, a camera. The image acquisition section 18 captures an image of an area targeted for security, and notifies the image processing section 17 of the captured image. In the present embodiment, the image capturing range of the camera is fixed.

Figures 3, 4A, 4B:
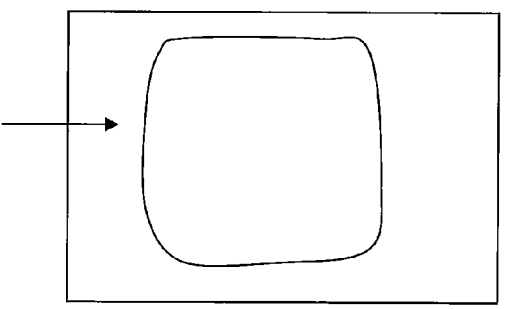
FIG. 3 is a diagram showing an example of data indicating cutout areas held in a cutout area storage section 13 according to the first embodiment of the present invention.
FIG. 4A is a diagram showing an example of data of private areas held in a private area storage section 14 according to the first embodiment of the present invention.
FIG. 4B is a diagram showing an example of data of private areas held in the private area storage section 14 according to the first embodiment of the present invention.

Next, data used in the image distribution apparatus 100 according to the first embodiment of the present invention will be described in detail. FIG. 3 shows an example of data indicating cutout areas stored in the cutout area storage section 13. For example, when receiving a distribution request from a user, the cutout area storage section 13 stores, as a cutout area, an area which is set in the received distribution request. In this example, each cutout area is a rectangle, and is represented by X and Y coordinates of the upper left point, the width (w), and the height (h), of the rectangle.

FIG. 4A and FIG. 4B each show an example of data indicating private areas stored in the private area storage section 14. FIG. 4A shows an example of the case where private areas are stored as areas enclosed by straight lines. In the example shown in FIG. 4A, as the data indicating private areas, an area ID and coordinate points (x1, x2, x3, x4) are registered for each user ID. Each private area is stored as an area enclosed by straight lines connecting the four points. However, each private area may be stored as an area enclosed by curved lines, such as Bezier curves. FIG. 4B shows an example of the case where private areas are stored as image data. In the example shown in FIG. 4B, as the data indicating private areas, an area ID and an image data address are stored for each user ID. Each image data is stored in the private area storage section 14 as, for example, bitmap data.

Next, image processing rules stored in the image processing level storage section 15 will be described. FIG. 5A is a diagram showing an example of an area-type-dependent privacy level management table which is one of the image processing rules. In FIG. 5A, image processing levels corresponding to area types (for example, private area, public area, another person's private area, boundary area) which have different levels of privacy are stored in the area-type-dependent privacy level management table. Based on the area-type-dependent privacy level management table, the image processing area generation section 16 determines, for example, to perform image processing with a high resolution for the private area, and to change the image of the boundary area to an image having a moderate level of resolution. In the image processing rule, an image processing level for generating a high-resolution image (i.e., a clear image) is set for the private area, whereas image processing levels for generating an image having a lower resolution than that for the private area (i.e., a less clear image) are set for the other areas for the purpose of privacy protection. It should be noted that the image processing level for generating an image having a lower resolution is a concept including not only reducing the resolution of image, but also performing image processing, such as blurring processing and mosaic processing, for the purpose of privacy protection.

FIG. 5B is a diagram showing an example of an area attribute information management table which is one of the image processing rules. In FIG. 5B, an additionally-permitted user ID and a resolution threshold are registered for each area ID in the area attribute information management table. The use of the area attribute information management table makes it possible to set attributes of users with respect to each area corresponding to an area ID. For example, a setting is made such that an image of an area corresponding to an area ID "1" is transmitted to a user having an additionally-permitted user ID "350" without being processed with a low resolution (for example, without being subjected to blurring processing). That is, if a user has a registered additionally-permitted user ID which corresponds to an area ID, even when an area corresponding to the area ID is a private area of another person, the image of the area can be transmitted to the user with a high resolution as in the case of the user's private area.

Further, in FIG. 5B, resolution thresholds are used in the area attribute information management table. Therefore, the level of resolution can be set for an area corresponding to an area ID such that the image of the area is not processed with a low resolution (for example, the image of the area is not subjected to blurring processing). For example, in the case of the area corresponding to the area ID "1", if the image of the area is captured with such a resolution as to make the size of the area equal to or smaller than a size corresponding to 5 pixels, the size of the area is small enough so that there is no possibility of the image being distributed as private information. Therefore, the image is distributed without being subjected to blurring processing. As the image processing rule stored in the image processing level storage section 15, only the area-type-dependent privacy level management table shown in FIG. 5A may be stored, or both the area-type-dependent privacy level management table shown in FIG. 5A and the area attribute information management table shown in FIG. 5B may be stored.

Figure 6:
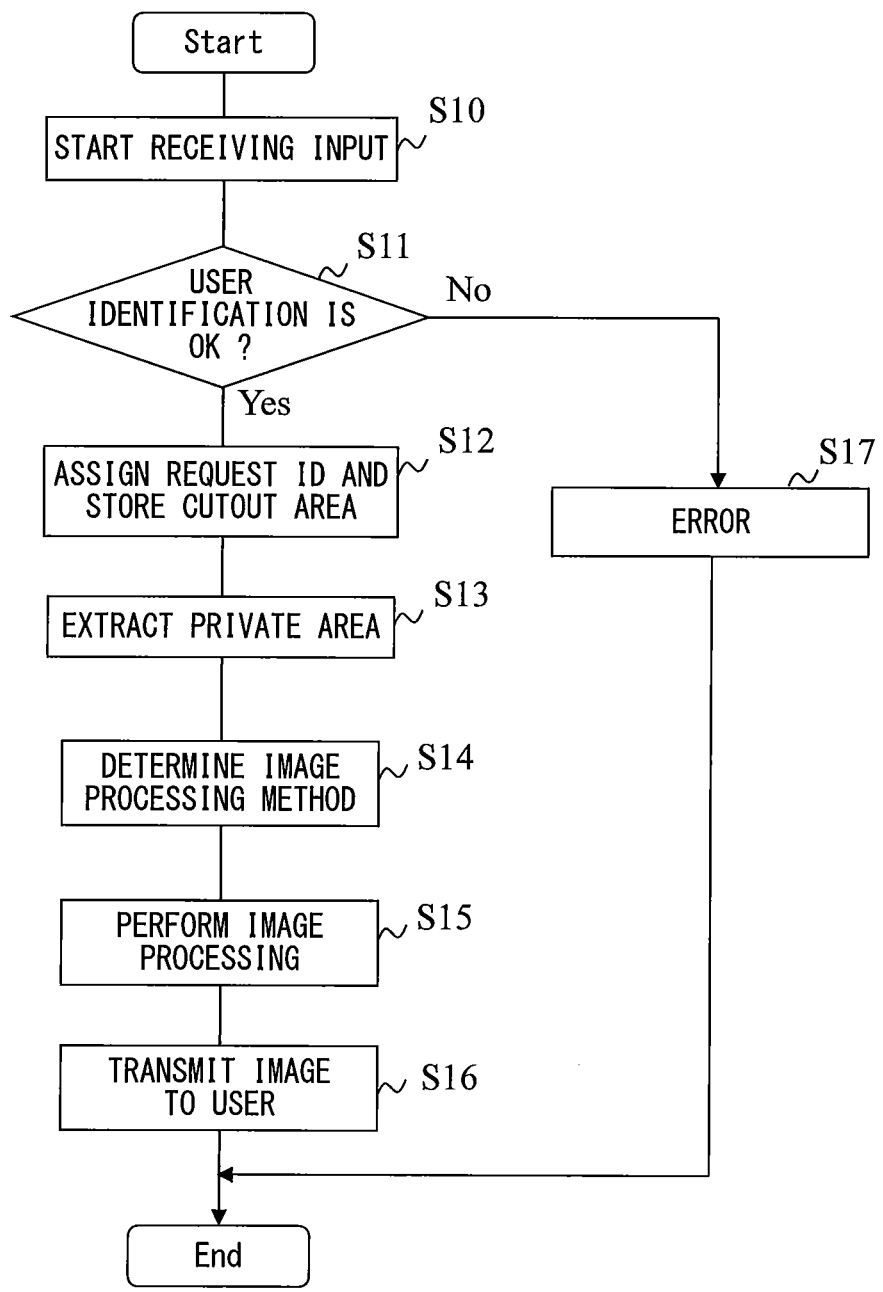
FIG. 6 is a flowchart showing an example of the operations that the image distribution apparatus 100 according to the first embodiment of the present invention performs when distributing an image.

The following will describe, with reference to FIG. 6, the operations that the image distribution apparatus 100 according to the first embodiment of the present invention performs when distributing an image. Referring to FIG. 6, the image distribution apparatus 100 is on standby for receiving an input from a client device 50 (step S10). An operation by a user who requests image distribution causes the client device 50 to transmit an image distribution request to the image distribution apparatus 100 via the network 30. User information and an area (distribution-requested area) that is requested by the user to be distributed are set in the distribution request.

Next, in the image distribution apparatus 100 having received the distribution request, the communication section 11 transfers the user information set in the distribution request to the identification section 12. When the identification section 12 succeeds in identifying the user from the transferred user information (step S11: Yes), the process proceeds to step S12. When the identification section 12 fails to identify the user (step S11: No), the request is regarded as an error (step S17), and then the process ends.

In addition, the identification section 12 determines an user ID from the user information, and transfers, to the cutout area storage section 13, the user ID and the distribution-requested area received from the communication section 11. For example, as shown in FIG. 3, the cutout area storage section 13 assigns a request ID to the received distribution-requested area, and stores the distribution-requested area as a cutout area along with the user ID (step S12).

When the cutout area storage section 13 has stored the cutout area, the image processing area generation section 16 makes an inquiry along with the user ID to the private area storage section 14 as to whether private areas are contained in the cutout area. The private area storage section 14 extracts, based on the user ID, a private area of the user and private areas of other people than the user from the cutout area, and returns the extracted private areas to the image processing area generation section 16 (step S13).

Next, the image processing area generation section 16 makes an inquiry to the image processing level storage section 15 about what levels of resolutions should be used in image processing for the private area of the user, the private areas of others, and another type of area, i.e., a public area, or as to whether the images of these areas should be processed. In addition, the image processing area generation section 16 checks, for each of the private areas, whether the additionally-permitted user ID is identical to the user ID. When the additionally-permitted user ID is identical to the user ID, the private area is determined to be an area of which an image can be distributed to the user.

After having determined the resolution for a private area, the image processing area generation section 16 calculates the size of the private area on the basis of the number of pieces of pixel data contained in the private area. When the size is smaller than a value stored as a resolution threshold, it is determined that problems concerning privacy will not occur because the image of the private area is sufficiently rough, and thus blurring processing can be omitted. After these processes are completed, the image processing area generation section 16 finally determines an image processing method, and notifies the image processing section 17 of the image processing method (step S14).

The image processing section 17 processes an image obtained from the image acquisition section 18 in accordance with the image processing method obtained from the image processing area generation section 16 (step S15), and transmits the processed image to the client device 50 via the communication section 11 and the network 30 (step S16). It should be noted that a plurality of private areas of others are subjected to OR operation and transmitted as one area to the image processing section 17, and therefore the image processing section 17 only needs to perform image processing for the one area in order to process the images of the plurality of private areas of others.

The following will describe the operations performed in the case where a plurality of users designate one area as their private area. When a user can clearly determine that another person designates the user's private area as a private area of the other person, the user may make contact with the other person (or an administrator) to request him or her to change the designation of the private area. When an overlap area between the user's private area and the other person's private area is within the margin of error, the overlap area may be designated as a boundary area, and the boundary area may be blurred. When the size of the overlap area between the user's private area and the other person's private area is larger than or equal to a certain size, the overlap area can be handled as the user's private area.

As an example of the case where a plurality of users designate one area as their private area, a case is conceivable where a plurality of users designate a common space of a duplex house or a multifamily house as their private area. In this case, if a user designates an area as his or her private area, even when the same area is designated also as a private area of another person, the designation as the user's private area may be given priority. For example, consideration will be given to the case where two private areas which are the same area but correspond to different user IDs are stored in the private area storage section 14 (see FIG. 7A, for example). One area ID or different area IDs may be set for the same area. In this case, the image processing area generation section 16 refers to the private area storage section 14, and handles the area that corresponds to the user ID of the identified user preferentially as a private area of the user.

In the example of the case where a plurality of users designate one area as their private area, a setting may be made by using the area attribute information management table which is one of the image processing rules such that the common space is handled as a private area of each of the plurality of users. That is, the plurality of users can designate the common space as their private area by setting additionally-permitted user IDs for an area ID representing the common space in the area attribute information management table. In an example shown in FIG. 7B, additionally-permitted user IDs "570" and "571" are set for the area corresponding to the area ID "1".

Alternatively, "group area" may be added as another area type to the area-type-dependent privacy level management table which is one of the image processing rules (see FIG. 7C, for example). The group area means an area that a plurality of users can designate as a target for monitoring. Further, the area type may be added to the area attribute information management table which is one of the image processing rules (see FIG. 7D, for example). In this case, one user (user ID "568") is allowed to have both the area ID "1" corresponding to his or her private area and an area ID "2" corresponding to a group area, and both of these areas are stored as private areas of the user in the private area storage section 14 (see FIG. 7E, for example). By specifying the area ID corresponding to the group area, a plurality of users can share the group area among them, and can change the level of resolution for the group area.

In the manner described above, the image distribution apparatus 100 distinguishes among a private area of a user, private areas of other people than the user, a public area, and the like, performs image processing for each area with an optimal resolution or performs blurring processing, and then distributes the resultant image to the user. This makes it possible to perform an appropriate image distribution which ensures both security and privacy protection according to the private area of the user, the public area, and the like. For example, a user who requests image distribution can check the user's own private area in every detail with a high-resolution image, while the user can check a public road with a low resolution with a certain degree of attention to the privacy of others.

In addition, since each user registers his or her private area, an area that the user does not want another person to see is sufficiently covered. Further, even when a user who views a distributed image does not know which area relates to which person's privacy, the user can view all areas except for those relating to the privacy of others. Still further, in the case where the size of a captured image of a private area is small enough so that the privacy is sufficiently taken care of, blurring processing may be omitted.

The private area storage section 14 may recognize, as a boundary area, an overlap portion between private areas or an area containing the overlap portion and its vicinity, and notify the image processing area generation section 16 of the boundary area. Alternatively, the image processing area generation section 16 may detect a boundary area between private areas based on data of the private areas. The image processing area generation section 16 may acquire an image processing level for the boundary area from the image processing level storage section 15, and then the image processing section 17 may process the image of the boundary area in accordance with the acquired image processing level. In the example shown in FIG. 5A, an image of a boundary area is displayed with a moderate level of resolution, and therefore image distribution that takes into account privacy protection and security can be performed.

An area to be distributed to a user is specified by the user. However, if, for example, an area to be distributed contains a blurred area 51 such as a private area of another person as shown in FIG. 8, the image processing section 17 may perform image processing to remove the blurred area 51. The blurred area 51 has no significance for the user targeted for image distribution. If the image distribution apparatus 100 does not distribute the blurred area 51, the rectangular area to be distributed becomes small. By removing an area unnecessary for a user and then performing image distribution as described above, it is possible to reduce the communication time and traffic rate.

In the above description, as shown in FIG. 4A and FIG. 4B, areas enclosed by two-dimensional straight or curved lines are registered by users as their private areas in the private area storage section 14. However, as shown in FIG. 9A, an image distribution apparatus 100b may generate a 3D model from a stereo image captured by a stereo camera of which the position and parameters are known, check the 3D model against 2D private areas to determine which area of the stereo image belongs to which user's private area, and then hold the private areas thus determined.

Figure 9B:
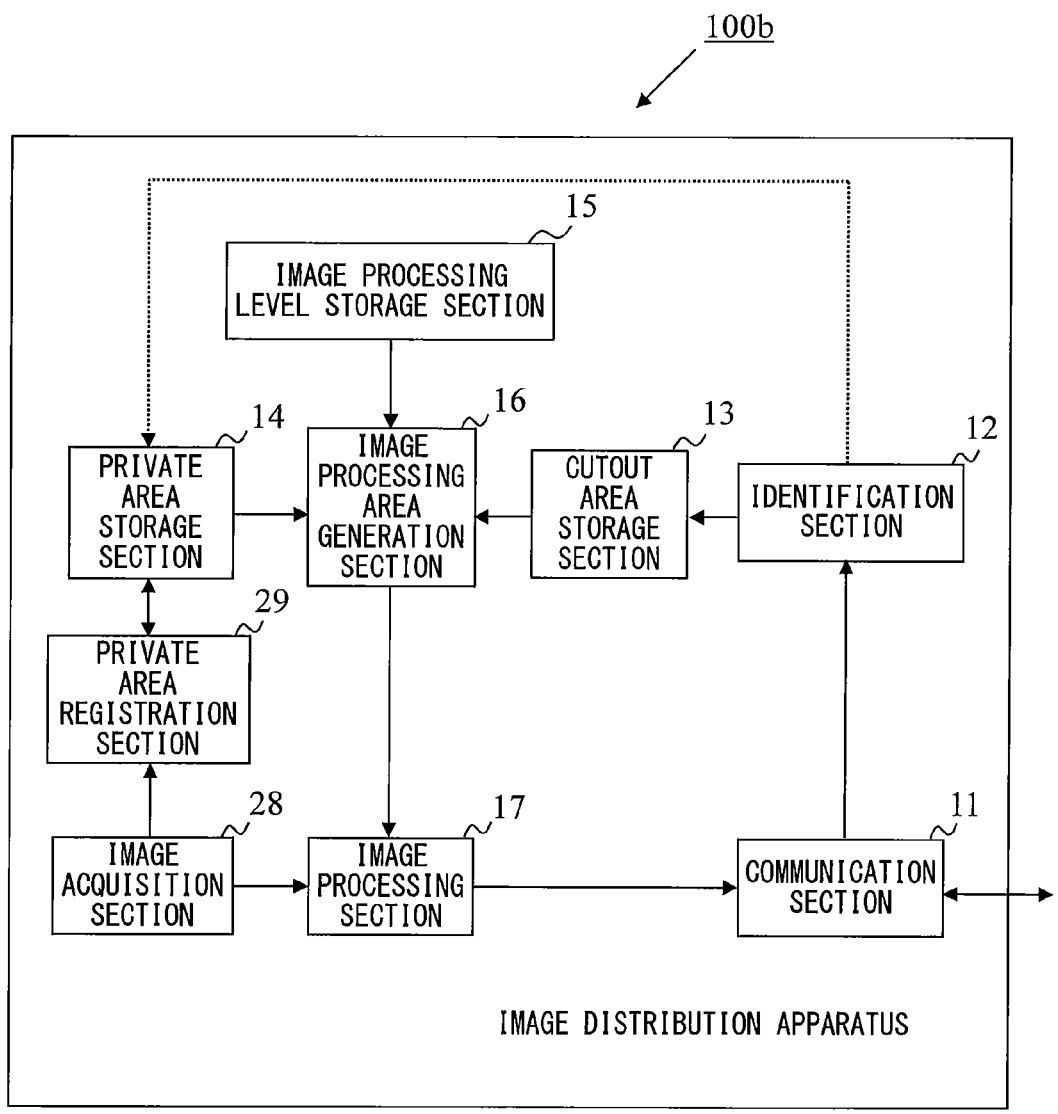
FIG. 9B is a block diagram showing an example of the configuration of an image distribution apparatus 100b according to the first embodiment of the present invention.

FIG. 9B is a block diagram showing an example of the configuration of the image distribution apparatus 100b. In FIG. 9B, an image acquisition section 28 is configured as a stereo camera. A private area registration section 29 has the function of storing, into the private area storage section 14, private areas acquired based on a stereo image captured by the stereo camera. For example, the private area registration section 29 compares X coordinates and Y coordinates of a 3D model, which is generated from a stereo image, with X coordinates and Y coordinates of private areas which are held in advance. Subsequently, the private area registration section 29 reconstructs, on a two-dimensional image, a set of points in the 3D model which correspond to the X coordinates and Y coordinates of the private areas, and determines which area on the two-dimensional image corresponds to which user's private area, and then performs registration in the private area storage section 14. In this manner, the image distribution apparatus 100b performs registration of private areas by means of a stereo image captured by the stereo camera and a map showing 2D private areas. This can save users the trouble of registering their private areas every time of use.

(Second Embodiment)

FIG. 10 is a block diagram showing an example of the configuration of an image distribution apparatus 200 according to a second embodiment of the present invention. When compared to the image distribution apparatus 100 according to the first embodiment, the image distribution apparatus 200 shown in FIG. 10 further includes a public area storage section 19. The public area storage section 19 stores public areas each of which is generated by the image processing area generation section 16 and corresponds to a user ID and a distribution-requested area of the user. In the image distribution apparatus 200, the same components as those in FIG. 1 and FIG. 2 are denoted by the same reference characters, and the description thereof is omitted.

FIG. 11 shows an example of data indicating the public areas stored in the public area storage section 19. As shown in FIG. 11, when a user having a user ID "568" requests an area of which the upper left X coordinate, the upper left Y coordinate, the width, and the height are respectively represented as (10, 10, 30, 50), a public area generated at this time is stored in the public area storage section 19. In this case, a public area in front of a house is stored along with a public area ID "500". When the same user requests the distribution of the same area again, the image processing area generation section 16 uses the data of the area stored in the public area storage section 19 instead of calculating a public area anew. The image processing section 17 performs image processing in accordance with the public area of which the area generation section 16 notifies the image processing section 17.

In the above described configuration, data of a public area stored in the public area storage section 19 is used, whereby the public area can be determined more readily as compared to the case where a public area is calculated each time a request is received from a user. This enables increasing the speed of the processing.

The public area storage section 19 may store not only public areas but also processing methods for the public areas. In addition, the public area storage section 19 may store boundary areas and processing methods for the boundary areas.

(Third Embodiment)

Figure 12:
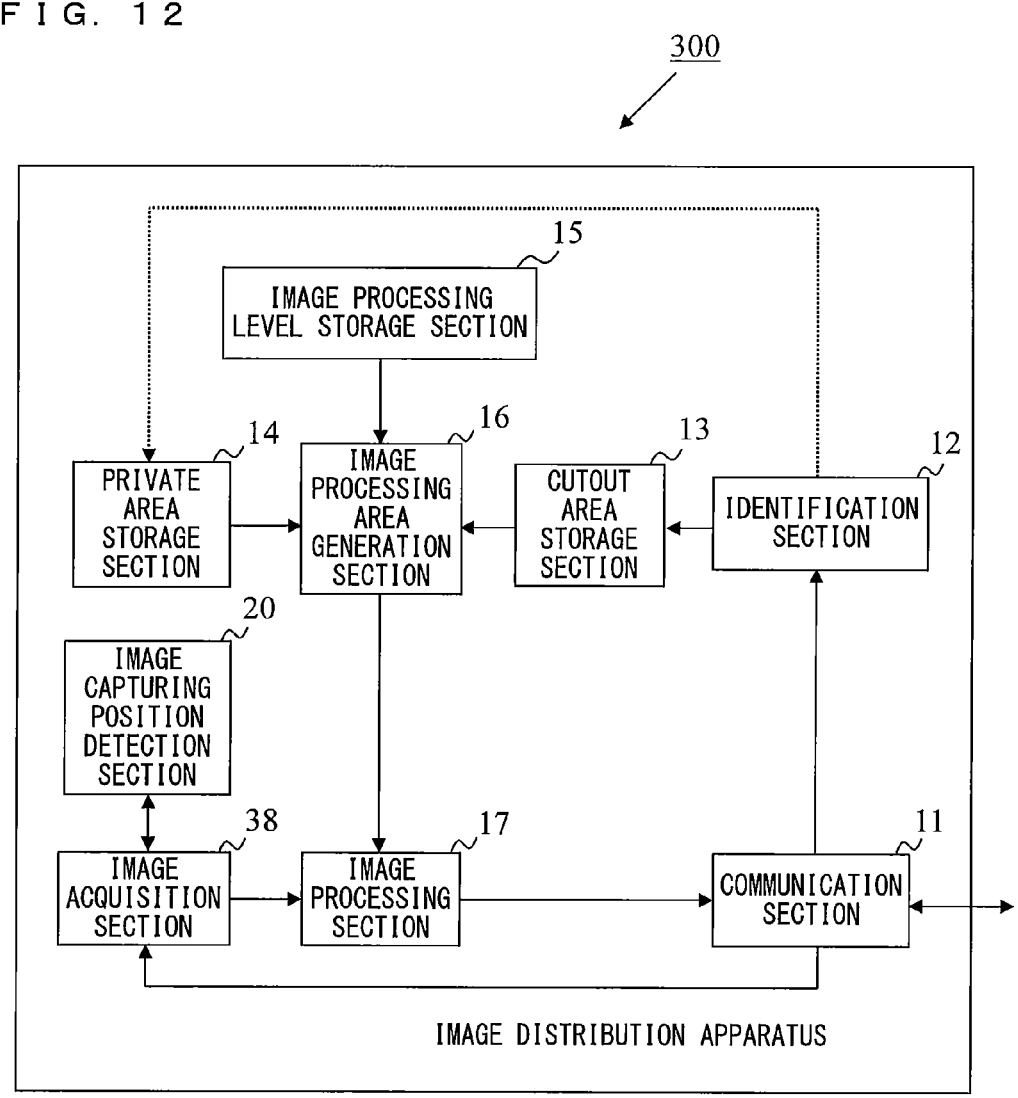
FIG. 12 is a block diagram showing an example of the configuration of an image distribution apparatus 300 according to a third embodiment of the present invention.

In an image distribution apparatus 300 according to a third embodiment, a camera can perform image capturing while moving or performing zooming in response to a request from a user. FIG. 12 is a block diagram showing an example of the configuration of the image distribution apparatus 300 according to the third embodiment of the present invention. When compared to the image distribution apparatus 100 according to the first embodiment, the image distribution apparatus 300 shown in FIG. 12 further includes an image capturing position detection section 20. The image capturing position detection section 20 detects the image capturing position of the camera when the camera moves or performs zooming. An image acquisition section 38 changes the image capturing position of the camera in accordance with an instruction to cause the camera to move or perform zooming. The instruction is inputted via the communication section 11 or the like. In the image distribution apparatus 300, the same components as those in FIG. 1 and FIG. 2 are denoted by the same reference characters, and the description thereof is omitted.

Figure 13A:
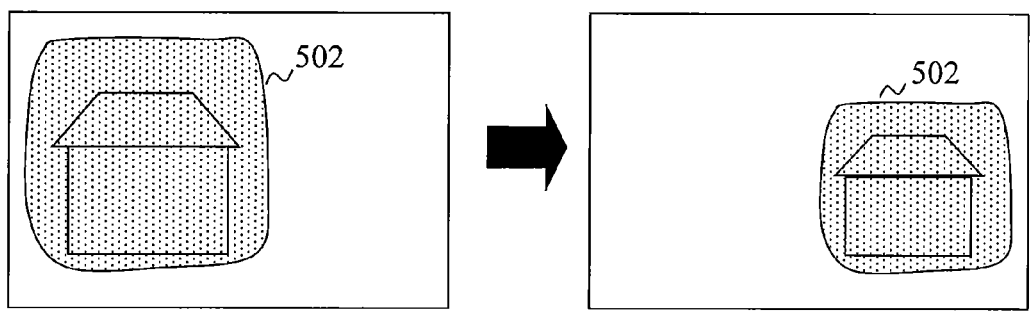
FIG. 13A is a diagram illustrating a first method for detecting the image capturing position of a camera.

In the image distribution apparatus 300, when the camera performs image capturing while moving or performing zooming, the image capturing position of the camera can be detected by using, for example, either of the two methods described below. In the first method, as shown in FIG. 13A, the image capturing position detection section 20 stores in advance a reference image 502 within the image-captured area at the original position of the camera. Next, when the image-captured area changes due to the movement or the zooming of the camera, the image capturing position detection section 20 determines, through image recognition processing, how the reference image 502 has changed within the image-captured area, and detects the image capturing position of the camera based on the change of the reference image 502.

In the second method, as shown in FIG. 13B, the image capturing position detection section 20 holds in advance an interrelationship between a target point and the image capturing position of the camera (for example, a distance between the target point and the camera) at the original position of the camera. Next, the image capturing position detection section 20 determines, based on the movement angle due to the panning of the camera and the like, the interrelationship after the movement of the camera between the target point and the camera. Subsequently, the image capturing position detection section 20 calculates to which position on the image the target point is shifted, using the change of the interrelationship and the intrinsic parameters of the camera such as the focal length of the camera. In this manner, the image capturing position detection section 20 detects the image capturing position of the camera.

In the image distribution apparatus 300, the image capturing position detection section 20 detects the image capturing position of the camera in the above-described manner. Therefore, even when the camera performs image capturing while moving or performing zooming, the image distribution apparatus 300 can distinguish among a private area of a user, private areas of other people than the user, and a public area, perform image processing for each area with an optimal resolution or perform blurring processing, and then distribute the resultant image.

(Fourth Embodiment)

An image distribution apparatus 400 according to a fourth embodiment is configured such that when a target object of a user is found, a high-resolution image (or an image processed in the same manner as that for the user's private area) of the target object can be selectively distributed even in the case where the target object overlaps a private area of another person. FIG. 14 is a block diagram showing an example of the configuration of the image distribution apparatus 400 according to the fourth embodiment of the present invention. When compared to the image distribution apparatus 100 according to the first embodiment, the image distribution apparatus 400 shown in FIG. 14 further includes an image registration section 21. Hereinafter, the process performed in the case where the target object is a suspicious person will be described.

Figure 15:
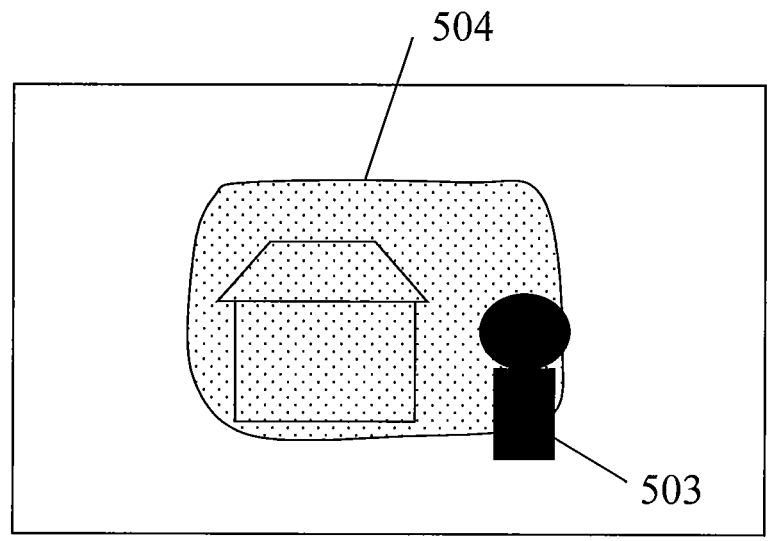
FIG. 15 is a diagram showing an example of the case where a private area and a suspicious person overlap each other in the fourth embodiment of the present invention.
Figure 16:
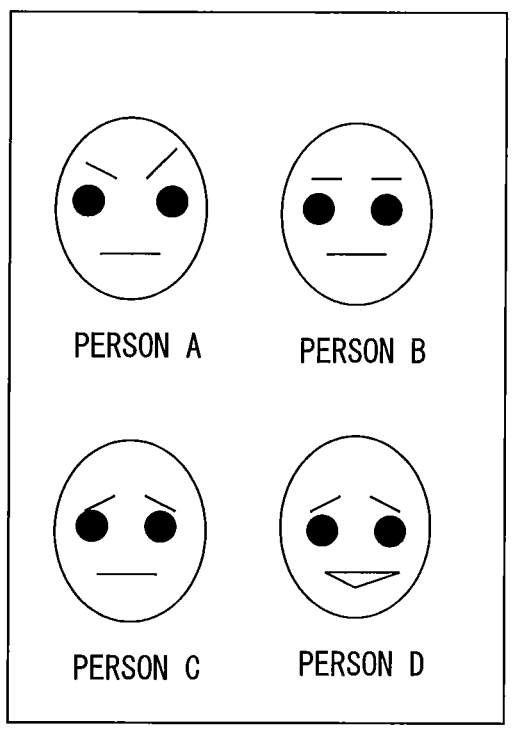
FIG. 16 is a diagram showing an example of a database of face images of related people which is registered in an image registration section 21.

In the case where a suspicious person 503 overlaps another person's private area 504 as shown in FIG. 15, the image distribution apparatus 400 selectively distributes a high-resolution image of the suspicious person 503. In the image registration section 21, for example, a database of face images of related people as shown in FIG. 16 is registered. The face images of the related people may be registered in the image registration section 21 in advance or by a client device 50 via the communication section 11. The image distribution apparatus 400 may selectively distribute a high-resolution image of the suspicious person 503 not only in the case where the suspicious person 503 overlaps the other person's private area 504, but also in the case where the suspicious person 503 overlaps an area for which an image processing level for generating an image having a lower resolution than that for the user's private area (i.e., a less clear image) is set for the purpose of privacy protection.

Figure 17:
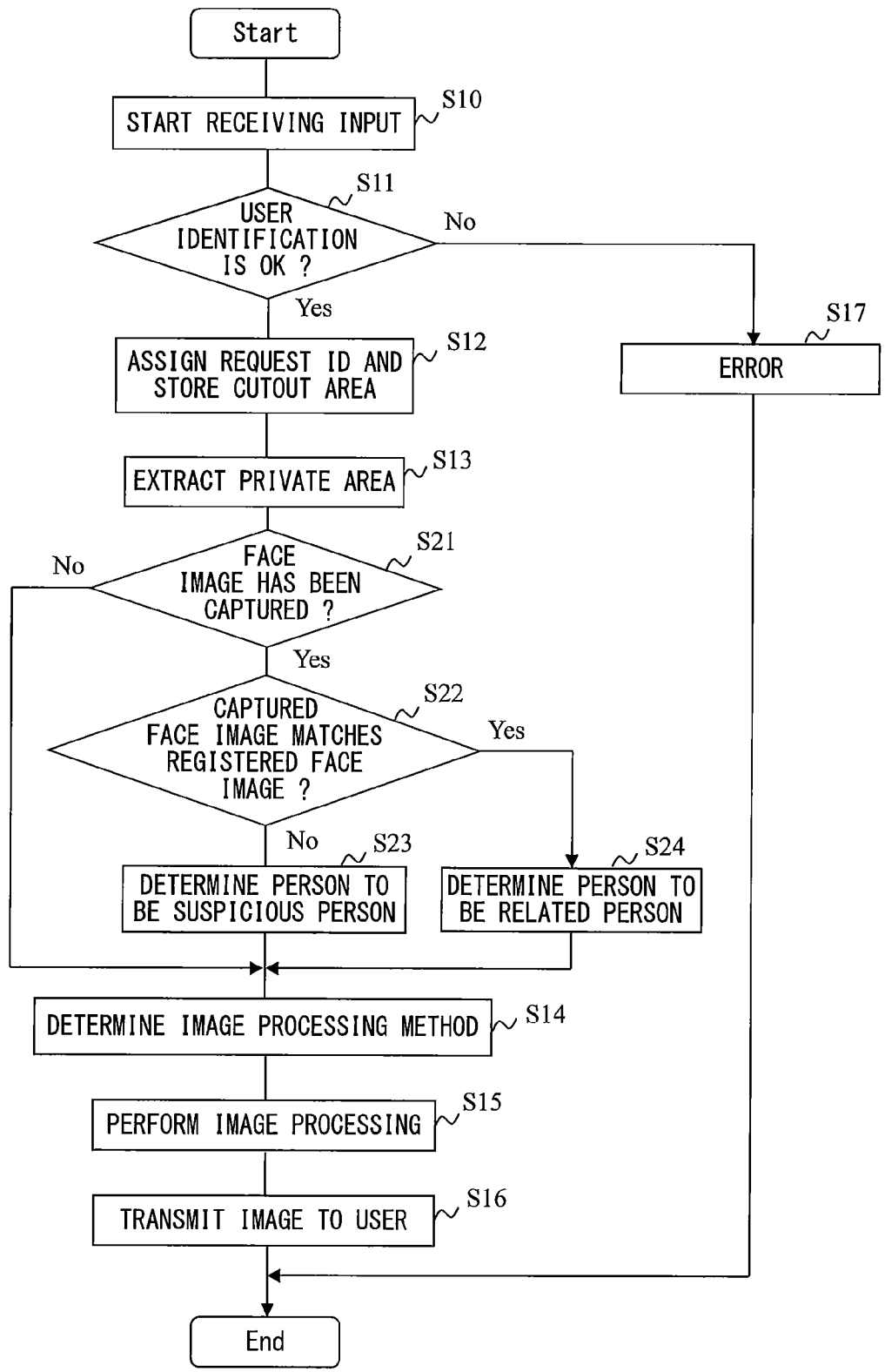
FIG. 17 is a flowchart showing an example of the operations that the image distribution apparatus 400 according to the fourth embodiment of the present invention performs when distributing an image.

FIG. 17 is a flowchart showing an example of the operations that the image distribution apparatus 400 performs when distributing an image. Referring to FIG. 17, the operations from step S10 to S13, and the operations from step S14 to S17 are the same as those in the first embodiment. Therefore, the description thereof is omitted. At step S21, the image processing area generation section 16 determines whether a face image of a person is captured and the person overlaps the other person's private area 504. When a face image of a person is not captured (step S21: No), the process proceeds to step S14, and thereafter, the same operations as those in the first embodiment are performed.

On the other hand, when a face image of a person is captured (step S21: Yes), the image processing area generation section 16 determines whether the captured face image of the person matches any one of the face images of the related people registered in the image registration section 21 (step S22). When the captured face image of the person does not match any one of the face images of the related people (step S22: No), the image processing area generation section 16 determines the person whose image is captured to be the suspicious person 503, and then determines to perform image processing with a high resolution for the suspicious person 503 (or an area containing the suspicious person 503) (step S23). On the other hand, when the captured face image of the person matches any one of the face images of the related people (step S22: Yes), the image processing area generation section 16 determines the person whose image is captured to be a related person, and then determines to perform image processing for the person in the same manner as that for the other person's private area 504.

If a face image of the suspicious person 503 can be obtained in advance, the image distribution apparatus 400 may register the face image of the suspicious person 503 in the image registration section 21, and search for the suspicious person 503 himself or herself. The face image of the suspicious person 503 may be registered in the image registration section 21 in advance or by a client device 50 via the communication section 11. In this case, if a face image of a person is captured and the person overlaps the other person's private area 504, the image processing area generation section 16 determines whether the captured face image of the person matches the face image of the suspicious person 503 registered in the image registration section 21, and then determines an image processing method.

When the captured face image of the person matches the face image of the suspicious person 503, the image processing area generation section 16 determines the person whose image is captured to be the suspicious person 503, and then determines to perform image processing with a high resolution for the suspicious person 503 (or an area containing the suspicious person 503). On the other hand, when the captured face image of the person does not match the face image of the suspicious person 503, the image processing area generation section 16 determines the person whose image is captured not to be the suspicious person 503, and then determines to perform image processing for the person in the same manner as that for the other person's private area 504.

Figures 18, 19:
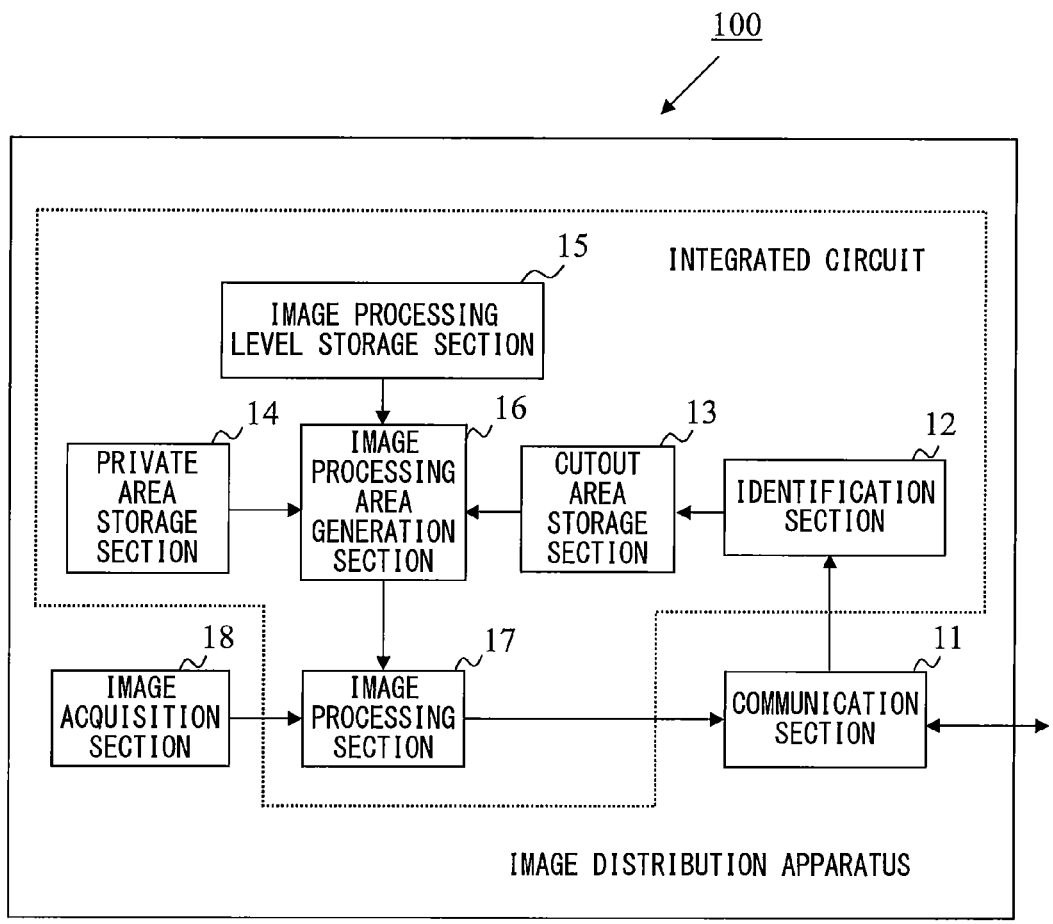
FIG. 18 is a diagram showing an example of an image processing rule (area-type-dependent privacy level management table) held in the image processing level storage section 15 according to the fourth embodiment of the present invention.
FIG. 19 is a block diagram showing an example of the configuration of an image distribution apparatus 100 which is configured by using an integrated circuit.

In addition, as shown in FIG. 18, "suspicious person area" may be registered as another area type in the area-type-dependent privacy level management table. In this case, the image processing area generation section 16 determines to perform image processing for the suspicious person 503 (or an area containing the suspicious person 503) in accordance with a level set in the area-type-dependent privacy level management table. The target object is not limited to a suspicious person, and may be, for example, a specific person, animal, or vehicle.

With the above configuration, when a target object of a user is found, the image distribution apparatus 400 can selectively distribute a high-resolution image of the target object even in the case where the target object overlaps a private area of another person.

The process steps executed by the functional blocks included in the image distribution apparatuses of the embodiments of the present invention may be realized by a CPU interpreting and executing predetermined program data which is capable of executing the above process steps stored in a storage device (ROM, RAM, hard disk, etc.). In this case, the program data may be installed in the storage device via a storage medium, or may be directly executed on the storage medium. Examples of the storage medium include: semiconductor memories such as a ROM, a RAM, and a flash memory; magnetic disk memories such as a flexible disk and a hard disk; optical disk memories such as a CD-ROM, a DVD, and a BD; and a memory card. The storage medium is a concept including communication media such as a telephone line and a transmission line.

The functional blocks included in the image distribution apparatuses of the embodiments of the present invention may be realized on an LSI which is an integrated circuit. For example, referring to FIG. 19, the identification section 12, the cutout area storage section 13, the private area storage section 14, the image processing level storage section 15, and the image processing area generation section 16 in the image distribution apparatus 100 may be configured on an integrated circuit. Each of these functional blocks may be separately integrated on one chip, or a part or all of these functional blocks may be collectively integrated on one chip. LSIs may be referred to as ICs, system LSIs, super LSIs, or ultra LSIs, depending on integration density.

The means for integration is not limited to LSIs. A dedicated circuit or a general purpose processor may be used. Alternatively, the following may be used: an FPGA (Field Programmable Gate Array) which is programmable after an LSI is produced; a reconfigurable processor in which the connections and settings of circuit cells within an LSI are reconfigurable. In addition, a configuration may be used in which a processor included in a hardware source equipped with a memory and the like executes a control program stored in a ROM.

As a matter of course, if a new integration technique which can serve as an alternative to LSIs appears as a result of the advancement of semiconductor technology or due to another derivative technology, the functional blocks may be integrated using the new technology. As an example, biotechnology has the potential to be employed.

INDUSTRIAL APPLICABILITY

The image distribution apparatus according to the present invention has the function of processing an image with attention to privacy, and is useful as a security camera, a monitoring system, and the like.

DESCRIPTION OF THE REFERENCE CHARACTERS 100, 200, 300, 400 image distribution apparatus
11 communication section
12 identification section 13 cutout area storage section
14 private area storage section
15 image processing level storage section
16 image processing area generation section
17 image processing section
18, 28, 38 image acquisition section
19 public area storage section
20 image capturing position detection section
21 image registration section
30 network
50 client device

The invention claimed is:

1. An image distribution apparatus which distributes a captured image to a client device, the image distribution apparatus comprising:
   a communication section for communicating with the client device;
   an image acquisition section for acquiring the captured image;
   a private area storage section for storing private areas relating to the privacy of users;
   an identification section for identifying a user based on information contained in an image distribution request received from the client device via the communication section;
   a cutout area storage section for storing, as a cutout area, an area requested by the identified user to be distributed;
   an image processing level storage section for storing an image processing rule that defines an image processing level for the private area of the identified user, an image processing level for the private area of the person other than the identified user, and an image processing level for a boundary area between private areas;
   an image processing area generation section for acquiring the cutout area of the identified user from the cutout area storage section, acquiring, from the private area storage section, a private area of the identified user and a private area of a person other than the identified user, which private areas are contained in an image of the acquired cutout area, acquiring the image processing rule from the image processing level storage section, and determining an image processing method for each area in the cutout area in accordance with the acquired image processing rule; and
   an image processing section for processing the image acquired by the image acquisition section in accordance with the image processing method determined by the image processing area generation section.

2. The image distribution apparatus according to claim 1, wherein
   the image processing level for the private area of the other person is for generating a less clear image than an image of the private area of the identified user for the purpose of privacy protection.

3. The image distribution apparatus according to claim 2, wherein the image processing area generation section determines to perform image processing with a high resolution for the private area of the identified user, and perform image processing with a low resolution for the private area of the other person, in accordance with the image processing rule acquired from the image processing level storage section.

4. The image distribution apparatus according to claim 3, further comprising an image registration section in which a face image of a related person is registered, wherein
   when a captured face image of a person overlapping the private area of the other person does not match the face image of the related person which is registered in the image registration section, the image processing area generation section determines the person whose image is captured to be a suspicious person, and determines to perform image processing with a high resolution for the suspicious person.

5. The image distribution apparatus according to claim 4, wherein
   the image processing level storage section further stores an image processing rule that defines an image processing level for the suspicious person, and
   the image processing area generation section determines an image processing method for the suspicious person in accordance with the image processing level for the suspicious person.

6. The image distribution apparatus according to claim 3, wherein
   the image processing level storage section stores a resolution threshold corresponding to the private area of the other person; and
   when the size of the private area of the other person is smaller than the resolution threshold, the image processing area generation section determines not to perform image processing with a low resolution for the private area of the other person for the purpose of privacy protection.

7. The image distribution apparatus according to claim 3, wherein
   the image processing level storage section stores an additionally-permitted user ID corresponding to the private area of the other person, and
   when a user ID of the user targeted for image distribution is identical to the additionally-permitted user ID, the image processing area generation section determines not to perform image processing with a low resolution for the private area of the other person.

8. The image distribution apparatus according to claim 1, wherein
   the image processing level storage section notifies the image processing area generation section of the image processing level for the boundary area as an image processing level for an area and its vicinity, where the private area of the identified user and the private area of the other person are close to each other, and
   the image processing level for the boundary area is for generating a less clear image than an image of the private area of the identified user for the purpose of privacy protection.

9. The image distribution apparatus according to claim 8, wherein the image processing area generation section determines to perform image processing with a high resolution for the private area of the identified user, and perform image processing with a low resolution for the boundary area , in accordance with the image processing rule acquired from the image processing level storage section.

10. The image distribution apparatus according to claim 1, wherein
    the image processing level storage section notifies the image processing area generation section of the image processing level for the boundary area as an image processing level for an area and its vicinity, where the private area of the identified user and the private area of the other person overlap each other, and
    the image processing level for the boundary area is for generating a less clear image than an image of the private area of the identified user for the purpose of privacy protection.

11. The image distribution apparatus according to claim 1, wherein
the image processing level storage section stores an image processing rule that defines an image processing level for a public area including all areas other than private areas, and
the image processing level for the public area is for generating a less clear image than an image of the private area of the identified user for the purpose of privacy protection.

12. The image distribution apparatus according to claim 11, wherein the image processing area generation section calculates, within the cutout area of the identified user, the public area including all areas other than private areas, and determines to perform image processing with a high resolution for the private area of the identified user, and perform image processing with a low resolution for the public area, in accordance with the image processing rule acquired from the image processing level storage section.

13. The image distribution apparatus according to claim 12, further comprising a public area storage section for storing the public area corresponding to an ID of the identified user and the area requested by the identified user to be distributed, wherein
when the same user requests the same area to be distributed, the image processing area generation section reads out, from the public area storage section, the public area corresponding to the ID of the identified user and the area requested by the identified user to be distributed, and determines to perform image processing for the read public area.

14. The image distribution apparatus according to claim 1, wherein the cutout area storage section sequentially receives different areas requested by the identified user to be distributed, and changes the cutout area in accordance with the received area.

15. The image distribution apparatus according to claim 1, comprising:
the image acquisition section acquiring a stereo image; and
a private area registration section for generating a three-dimensional model from the stereo image acquired by the image acquisition section, performing matching between the three-dimensional model and map data in which two-dimensional private areas are written to determine whether each area of the stereo image is a private area of a user, and registering the private area thus determined in the private area storage section.

16. The image distribution apparatus according to claim 1, wherein when detecting that the periphery of image data to be distributed to a user has been subjected to image processing for the purpose of privacy protection, the image processing section removes the periphery, and notifies the communication section of the resultant image data.

17. A method performed by an image distribution apparatus which distributes a captured image to a client device,
the image distribution apparatus comprising:
a private area storage section for storing private areas relating to the privacy of users;
a cutout area storage section for storing a cutout area of which an image is to be distributed to a user; and
an image processing level storage section for storing an image processing rule that defines an image processing level for the private area of the identified user, an image processing level for the private area of the person other than the identified user, and an image processing level for a boundary area between private areas, and the method comprising the steps of:
acquiring the captured image;
identifying a user based on information contained in an image distribution request received from the client device;
storing, as the cutout area, an area requested by the identified user to be distributed in the cutout area storage section;
acquiring the cutout area of the identified user from the cutout area storage section, acquiring, from the private area storage section, a private area of the identified user and a private area of a person other than the identified user, which private areas are contained in an image of the acquired cutout area, acquiring the image processing rule from the image processing level storage section, and determining an image processing method for each area in the cutout area in accordance with the acquired image processing rule; and
processing the acquired image in accordance with the image processing method.

18. A non-transitory computer-readable recording medium storing a program to be executed by an image distribution apparatus which distributes a captured image to a client device,
the image distribution apparatus comprising:
a private area storage section for storing private areas relating to the privacy of users;
a cutout area storage section for storing a cutout area of which an image is to be distributed to a user; and
an image processing level storage section for storing an image processing rule that defines an image processing level for the private area of the identified user, an image processing level for the private area of the person other than the identified user, and an image processing level for a boundary area between private areas, and
the program performing the steps of:
acquiring the captured image;
identifying a user based on information contained in an image distribution request received from the client device;
storing, as the cutout area, an area requested by the identified user to be distributed in the cutout area storage section;
acquiring the cutout area of the identified user from the cutout area storage section, acquiring, from the private area storage section, a private area of the identified user and a private area of a person other than the identified user, which private areas are contained in an image of the acquired cutout area, acquiring the image processing rule from the image processing level storage section, and determining an image processing method for each area in the cutout area in accordance with the acquired image processing rule; and
processing the acquired image in accordance with the image processing method.

19. An integrated circuit included in an image distribution apparatus which distributes a captured image to a client device,
the image distribution apparatus comprising:
a communication section for communicating with the client device; and
an image acquisition section for acquiring the captured image, and the integrated circuit comprising:
a private area storage section for storing private areas relating to the privacy of users;

an identification section for identifying a user based on information contained in an image distribution request received from the client device via the communication section;
a cutout area storage section for storing, as a cutout area, an area requested by the identified user to be distributed;
an image processing level storage section for storing an image processing rule that defines an image processing level for the private area of the identified user, an image processing level for the private area of the person other than the identified user, and an image processing level for a boundary area between private areas;
an image processing area generation section for acquiring the cutout area of the identified user from the cutout area storage section, acquiring, from the private area storage section, a private area of the identified user and a private area of a person other than the identified user, which private areas are contained in an image of the acquired cutout area, acquiring the image processing rule from the image processing level storage section, and determining an image processing method for each area in the cutout area in accordance with the acquired image processing rule; and
an image processing section for processing the image acquired by the image acquisition section in accordance with the image processing method determined by the image processing area generation section.

\* \* \* \* \*